United States Patent Office 2,931,807
Patented Apr. 5, 1960

2,931,807
3-ACYLOXY-7,11-DIKETO-CYCLOPENTANO-PHENANTHRENE COMPOUNDS

Earl M. Chamberlin, Westfield, and John M. Chemerda, Metuchen, N.J., assignors to Merck & Co., Inc., Rahway, N.J., a corporation of New Jersey No Drawing. Application January 26, 1956
Serial No. 561,657

8 Claims. (Cl. 260—239.55)

This invention is concerned with novel chemical compounds of the cyclopentanopolyhydrophenanthrene series and processes for preparing the same; more particularly, it relates to novel cyclopentanopolyhydrophenanthrene compounds having functional substituents in ring C; and specifically it relates to new compounds having a hydroxyl or keto substituent at the 11-position, and to processes for the preparation of such compounds.

This application is a continuation-in-part of our application Serial No. 215,026, filed March 10, 1951, now abandoned, and our copending applications Serial No. 247,562, filed September 20, 1951, now Patent No. 2,854,464, and Serial No. 307,714, filed September 3, 1952.

Compounds of the adrenal cortex, such as Kendall's Compound E (Cortisone), have been found to be of great value in the treatment of various diseases. Further, it is likely that Kendall's Compound E and/or other closely related 11-hydroxy steroids will find increasing therapeutic use in the future. Unfortunately, the only method for the preparation of such compounds presently available utilizes desoxycholic or cholic acids as the starting material. Cholic and desoxycholic acids have hydroxy substituents in ring C at the 12-position, thus providing a means for introducing a functional substituent at the 11-position. However cholic and desoxycholic acids, which are obtained from animal bile, are only available in limited amounts. Heretofore no practical method was available whereby a functional group could be introduced in ring C which would permit the use of more abundant steroids such as the sterols, ergosterol, cholesterol, stigmasterol, or plant sapogenins, such as diosgenin, tigogenin, and the like.

It is an object of the present invention to provide a process for introducing a functional group in ring C at the 11-position. It is a further object to provide a process for converting cyclopentanopolyhydrophenanthrene compounds having a double bond in the 7:8 position to the corresponding cyclopentanopolyhydrophenanthrene compound having a hydroxyl or keto group at positions 7 and 11. Another object is to provide new compounds of the steroid series having functional groups in ring C suitable for the preparation of other cyclopentanopolyhydrophenanthrene compounds. Other objects will be apparent from the detailed description hereinafter provided.

In accordance with our invention, we have now found that compounds of the cyclopentanopolyhydrophenanthrene series having an 11-keto substituent can be synthesized by reactions indicated as follows:

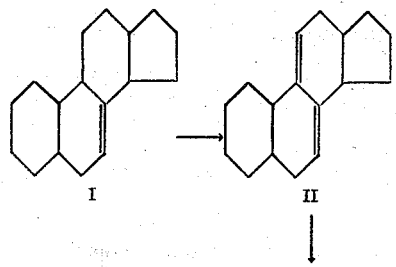

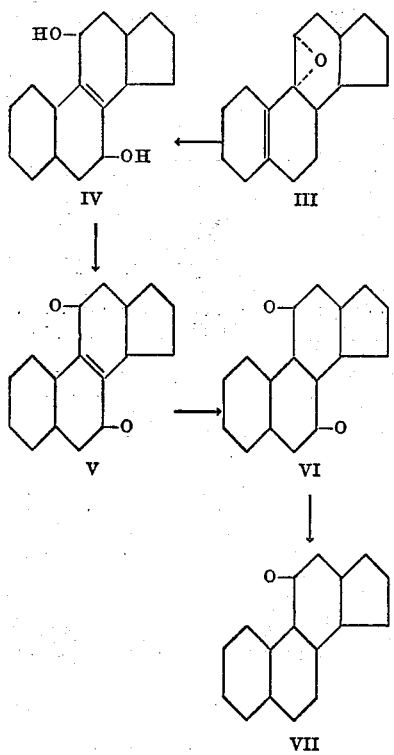

These reactions are carried out as follows:

A cyclopentanopolyhydrophenanthrene compound having a 7:8 double bond (I) is reacted with mercuric acetate producing the corresponding compound having conjugated double bonds in the 7:8 and 9:11 positions (II) which is treated with a per acid, thus forming an epoxide represented by the Formula III. This epoxide is then treated with an adsorbent to form the corresponding $\Delta^8$-7,11-dihydroxy compound (IV).

The $\Delta^8$-7,11-dihydroxy compound (IV) is reacted with an oxidizing agent to convert the hydroxy substituents to keto groups, thus obtaining the corresponding $\Delta^8$-7,11-diketo cyclopentanopolyhydrophenanthrene derivatives (V). These diketo compounds are then reduced to saturate the $\Delta^8$ double bond and form the corresponding 7,11-diketo compound VI. The saturated diketo compound is then reduced to eliminate the 7-keto-substituent, thus producing the corresponding 11-keto compound (VII). The latter compounds are useful intermediates for the preparation of 11-keto compounds having desirable therapeutic properties.

In accordance with the reactions described above cyclopentanopolyhydrophenanthrene compounds having double bonds in positions 7:8 and 9:11 are converted to the corresponding epoxide derivative; for example compounds such as ergosterol D, acyl derivatives of ergosterol D, 3-hydroxy-$\Delta^{7,9(11)}$-bisnorallocholadienic acid or esters thereof, 3-acyloxy-$\Delta^{7,9(11)}$-bisnorallocholadienic acid or esters thereof, 3-hydroxy-$\Delta^{7,9(11)}$-choladienic acid or esters thereof, 3-acyloxy-$\Delta^{7,9(11)}$-choladienic acid or esters thereof, $\Delta^{7,9(11)}$-dehydrotigogenin or acyl derivatives thereof, $\Delta^{7,9(11)}$-allopregnadiene-3-ol-20-one or its acyl derivatives, and the like are converted to the corresponding epoxide compounds.

The epoxides of $\Delta^{7,9(11)}$-cyclopentanopolyhydrophenanthrene compounds, such as the epoxides of ergosterol D, acyl derivatives of ergosterol D, 3-hydroxy-$\Delta^{7,9(11)}$-bisnorallocholadienic acid or its esters, 3-acyloxy-$\Delta^{7,9(11)}$- bisnorallocholadienic acid or its esters, 3-hydroxy-Δ$^{7,9(11)}$-choladienic acid or its esters, Δ$^{7,9(11)}$-dehydrotigogenin or its acyl derivatives, Δ$^{7,9(11)}$-allopregnadiene-3-ol-20-one or its acyl derivatives, and the like are converted to the corresponding Δ$^8$-7,11-dihydroxy derivatives.

Cyclopentanopolyhydrophenanthrene compounds having 7,11-diketo substituents such as, 3-acyloxy-7,11-diketo-Δ$^{8,22}$-ergostadiene, 3-acyloxy-7,11-diketo-Δ$^8$-bisnorallocholenic acid and its esters, 3-acyloxy-7,11-diketo-Δ$^8$-cholenic acid and its esters, 3-acyloxy-7,11-diketo-Δ$^8$-tigogenin, Δ$^8$-allopregnene-3-ol-7,11,20-trione and its acyl derivatives, and the like can be obtained by the oxidation of the corresponding 7,11-dihydroxy compounds. Further, these diketo compounds may be reduced to the corresponding compounds having a saturated bond in the 8:9 position.

The 7,11-diketo cyclopentanopolyhydrophenanthrene compounds can be reduced to the corresponding 11-keto compounds. We prefer to effect this reduction by reacting the 7,11-diketo compound with hydrazine hydrate and an alkali metal hydroxide at elevated temperatures in a high boiling solvent medium, for example, diethylene glycol. It is surprising that under these reaction conditions the 11-keto group is not simultaneously reduced along with the 7-keto group. On the contrary, we have found that under optimum conditions excellent yields of the desired 11-keto compounds are obtained by this reduction process.

Thus, in accordance with the processes described above 3-hydroxy-11-keto-Δ$^{22}$-ergostene, 3-hydroxy-11-keto-bisnorallocholanic acid, 3-hydroxy-11-ketotigogenin, and the corresponding esters, acyl derivatives, or esterified acyl derivatives can be prepared from the corresponding 7,11-diketo compounds. If desired, these 3-hydroxy-11-keto compounds may be oxidized to obtain the 3,11-diketo compounds in accordance with methods known in the art.

The Δ$^{7,9(11)}$ compounds of the cyclopentanopolyhydrophenanthrene series are conveniently prepared by reacting the corresponding Δ$^7$ compound with mercuric acetate. We have found that this reaction is preferably effected by reacting the Δ$^7$ compound with mercuric acetate and glacial acetic acid in the presence of a suitable solvent medium such as chloroform. The reaction is conveniently conducted by stirring the reaction mixture for 16–24 hours. After the reaction is completed, the Δ$^{7,9(11)}$ compound is recovered from the reaction mixture by removing the precipitated mercurous acetate, and concentrating the solution under diminished pressure. If desired, the residue may be further purified by crystallization from suitable solvents. Thus, this process can be utilized to prepare Δ$^{7,9(11)}$-pregnadiene-3-ol-20-one-3-acetate, and Δ$^{7,9(11)}$-dehydrotigogenin acetate from Δ$^7$-pregnenolone acetate and Δ$^7$-dehydrotigogenin acetate respectively. Alternatively, other acyl derivatives of these starting materials or the 3-hydroxy compounds may be utilized as starting materials in our process to prepare the corresponding Δ$^{7,9(11)}$ compounds.

Further, the 3-hydroxy-Δ$^{7,9(11)}$-choladienic acid, which is also useful as a starting material in the processes of our invention, is readily obtained by reducing 3-hydroxy-12-keto-Δ$^{7,9(11)}$-choladienic acid. This is conveniently accomplished by reacting the keto acid with hydrazine hydrate and an alkali metal hydroxide in the presence of a suitable high boiling solvent such as diethylene glycol.

This invention is concerned with androstenes and etiocholenes having a double bond in the 8:9 position, keto substituents at positions 7 and 11, a hydroxy or acyloxy group at position 3, and a substituent having at least two carbon atoms at position 17 joined to the nucleous by a carbon to carbon bond, and the corresponding saturated androstanes and etiocholanes. These compounds can be represented structurally as follows:

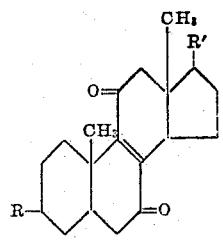

and

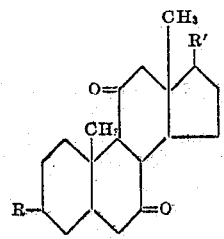

wherein R represents hydroxy or acyloxy and the acyl group is a lower fatty acid radical and R' represents a substituent of at least two carbon atoms joined to the nucleous by a carbon to carbon bond.

The starting materials used in the process of this invention, namely the Δ$^8$-dihydroxy compounds shown by Formula IV, may be obtained as described in copending application Serial No. 524,580, filed July 26, 1955.

Pursuant to our invention, we have found that the Δ$^8$-7,11-dihydroxy compounds are readily oxidized to obtain a new series of compounds having a double bond in the 8:9 position and keto substituents in the 7 and 11-positions. This oxidation is readily accomplished for example by treating the Δ$^8$-7,11-dihydroxy compounds with chromic acid in the presence of an acid such as acetic or sulfuric acid. We have found that an oxidation mixture consisting of chromic acid-acetone-sulfuric acid is particularly useful for this oxidation, and results in the obtainment of maximum yields of the desired diketo compound under optimum conditions. In carrying out this process, it is necessary to protect any other hydroxyl substituents, for example, a 3-hydroxy group, by converting this group to an acyloxy substituent. After the oxidation, any such acyloxy substituents can be readily hydrolyzed to prepare the corresponding hydroxy compounds.

These new Δ$^8$-7,11-diketo-cyclopentanopolyhydrophenanthrene compounds are reduced to saturate the 8:9 double bonds and produce the corresponding saturated 7,11-diketo compound. This reduction is conveniently accomplished for example by reacting the Δ$^8$ compound with zinc in the presence of acetic acid.

In accordance with the above-described methods, cyclopentanopolyhydrophenanthrene compounds having 7,11-diketo substituents such as 3-acyloxy-7,11-diketo-Δ$^{8,22}$-ergostadiene, 3-acyloxy-7,11-diketo-Δ$^8$-bisnorallocholenic acid and its esters, 3-acyloxy-7,11-diketo-Δ$^8$-cholenic acid and its esters, 3-acyloxy-7,11-diketo-Δ$^8$-tigogenin, Δ$^8$-allopregnene-3-ol-7,11,20-trione and its acyl derivatives, and the like can be obtained by the oxidation of the corresponding 7,11-dihydroxy compounds. Further, these diketo compounds may be reduced to the corresponding compounds having a saturated bond in the 8:9 position. The saturated 7,11-diketo compounds can then be reduced, as described above, to obtain the corresponding 11-keto compounds.

The 11-keto compounds obtained by the procedures described above, for example, 3-hydroxy-11-keto-bisnorallocholanic acid and 11-keto-tigogenin, can be readily converted to cortisone. Thus, by employing 3-hydroxy-11-keto-bisnorallocholanic acid as the starting material in place of the 3-hydroxy-11-keto-bisnorcholanic acid in the synthesis of cortisone described in U.S. Patent 2,492,188, the bisnorallocholanic acid can be converted to the allo compound corresponding to intermediate XXIV of this patent, namely, a compound of the following structural formula

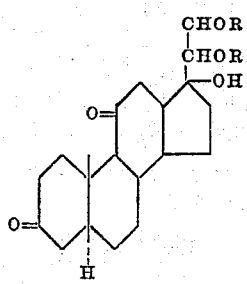

This compound can then be brominated to form the corresponding 2,4-dibromo compound. Upon treating this dibromo compound with sodium iodide in acetone solution it is converted to the corresponding 2-iodo compound which on reaction with chromous chloride yields the $\Delta^4$-3-keto compound which is compound XXVI of 2,492,188. This latter product can then be converted to cortisone following the procedures described in this patent.

11-keto-tigogenin is similarly a valuable intermediate in the synthesis of cortisone. Thus, 11-keto-tigogenin can be oxidized by reaction with chromium trioxide to obtain the corresponding 3,11-diketo compound. This compound can then be treated by the procedures described in Chemical and Engineering News, volume 27, pages 3348–3349, to form $\Delta^{16}$-3,11,20-triketo-allopregnene, and this compound can be further treated to introduce hydroxy substituents at positions 17 and 21. The $\Delta^{16}$-3,11,20-triketo-17,21-dihydroxy pregnene can then be catalytically hydrogenated to produce the saturated allopregnane compound. The 3,11,20-triketo-17,21-dihydroxy allopregnane can then be converted to cortisone following the procedures described in J. Am. Chem. Soc., 72, pages 4077–4080, for the introduction of a $\Delta^4$-double bond in 3-keto allosteroids.

Alternatively, other methods can also be utilized to convert the 11-keto steroids of the present invention to cortisone. Thus, the side chain at C–17 of 3-hydroxy-11-keto bisnorallocholanic acid and the esters and acylated derivatives thereof can be degraded by the application of the Barbier-Wieland method to obtain 3-hydroxy-11,20-diketo-allopregnane. For example, methyl 3-acetoxy-11-keto-bisnorallocholanate can be reacted with phenylmagnesium bromide in benzene to form the corresponding 22-hydroxy-22,22-diphenyl compound which on dehydration with acetic acid to the $\Delta^{21}$-22,22-diphenyl compound followed by oxidation with ozone yields 3-hydroxy-11,20-diketo allopregnane. Upon reacting the latter compound with lead tetraacetate in glacial acetic acid 3,21-diacetoxy-11,20-diketo allopregnane is obtained. Reaction of this compound with hydrogen cyanide in ethanol yields the cyanohydrin, 3,21 - diacetoxy - 11 - keto - 20 - hydroxy - 20 - cyanoallopregnane which on dehydration with phosphorous oxychloride in the presence of pyridine is converted to the $\Delta^{17(20)}$-20-cyano compound and is then partially esterified by reaction with acetic anhydride to form the corresponding 21-acetoxy ester. Oxidation of this 21-acetoxy ester by reaction with chromic acid in acetic acid affords the corresponding 3-keto compound, $\Delta^{17(20)}$-3,11-diketo-20-cyano-21-acetoxy allopregnene. Treatment of this compound with osmium tetroxide in dry pyridine forms the 17,20-osmate ester which on reaction with sodium sulfite is cleaved to form 3,11,20-triketo-17-hydroxy-21-acetoxy allopregnane. Bromination of the latter compound affords the 2,4-dibromo compound which on treatment with sodium iodide in acetone solution is converted to the corresponding 2-iodo compound. Reaction of this iodo compound with chromous chloride yields cortisone acetate.

Alternatively, other methods can be employed to convert the 3-hydroxy-11,20-diketo allopregnane to cortisone acetate. For example, the 3-hydroxy-11,20-diketo allopregnane can be reacted with acetic anhydride in the presence of p-toluene sulfonic acid to produce $\Delta^{17(20)}$-3,20-diacetoxy-11-keto allopregnene. Upon reacting the latter compound with perbenzoic acid in chloroform solution and saponifying the resulting reaction product with an alkali, 3,17($\alpha$)-dihydroxy-11,20-diketo allopregnane is obtained. This compound is then treated with bromine in acetic acid to form the corresponding 21-bromo compound which on treatment with potassium acetate and sodium iodide in acetone forms 3,17($\alpha$)-dihydroxy-11-keto-21-acetoxy allopregnane. Oxidation of this compound with N-bromoacetamide yields the corresponding 3-keto compound. By reacting this 3-keto compound with bromine to form the 2,4-dibromo derivatives, converting this dibromo compound to the 2-iodo compound, and reacting the iodo compound with chromous chloride, cortisone acetate is produced.

In a similar manner, 3-hydroxy-11-keto cholanic acid and the esters and acylated derivatives thereof can be converted by the application of the Barbier-Wieland degradation to obtain 3-hydroxy-11,20-diketo pregnane. For example, methyl 3-acetoxy-11-keto cholanate is reacted with phenylmagnesium bromide in benzene to form the corresponding 24-hydroxy-24,24-diphenyl compound which on dehydration with acetic acid followed by oxidation with ozone yields 3-hydroxy-11-keto-norcholanic acid. Upon reacting methyl-3-hydroxy-11-ketocholanate with phenylmagnesium bromide and then dehydrating and oxidizing the resulting product, 3-hydroxy-11-ketobisnorcholanic acid is obtained. Further degradation of this compound by this procedure via the 22-hydroxy-22-diphenyl and $\Delta^{21}$-22,22-diphenyl compounds yields 3-hydroxy-11,20-diketo pregnane. This compound can then be reacted with lead tetraacetate to obtain the 21-acetoxy derivatives which can then be converted to cortisone acetate following the procedures described in the Sarett Patent 2,541,105.

11-keto tigogenin is also useful in another way as an intermediate in the preparation of cortisone. Thus, 11-keto tigogenin can be reacted with acetic anhydride under pressure to obtain the corresponding pseudo-tigogenin acetate which on oxidation with chromic oxide and treatment of the resulting oxidized product with an alkali metal hydroxide is converted to 3,11,20-triketo-$\Delta^{16}$-allopregnene. Acetylation of this compound by reaction with acetic anhydryde and reduction of the resulting acetate derivative with hydrogen in the presence of palladium on carbon yields 3-hydroxy-11,20-diketo allopregnane. This compound can then be converted to cortisone by the processes described above.

Thus, the processes of our invention provide a convenient and practical method whereby compounds of the cyclopentanopolyhydrophenanthrene series which do not contain a functional group in ring C may be converted to the corresponding 11-hydroxy or 11-keto compounds. Therefore, as indicated previously, the production of Kendall's Compound E and similar compounds containing an 11-keto or hydroxy group is no longer limited by the availability of relatively scarce and expensive raw materials such as cholic or desoxycholic acid, and these therapeutically important compounds can be prepared from the more abundant plant sterols, sapogenins and degradation products thereof.

The following examples are presented to illustrate specific embodiments of our invention.

EXAMPLE 1

*Preparation of 3-acetoxy-7,11-diketo-$\Delta^{8,22}$-ergostadiene from 3-acetoxy-7,11-dihydroxy-$\Delta^{8,22}$-ergostadiene*

Two hundred milligrams of 3-acetoxy-7,11-dihydroxy-$\Delta^{8(9),22}$-ergostadiene suspended in 10 cc. of acetic acid was treated with 100 mg. of sodium dichromate. With gentle swirling, the product dissolved rapidly, the resulting green solution was diluted with water, and a gummy product separated which was extracted with benzene. The residue obtained after the removal of the benzene in vacuo crystallized readily from methanol in the form of compact rosettes of small needles. Yield: 40 mg., M.P. 121–123° C.; λ max. 2650 A., E% 147. Further purification by chromatography over alumina yielded pure 3-acetoxy-7,11-diketo-Δ$^{8,22}$-ergostadiene; M.P. 135–136° C.

*Analysis.*—Calc'd for $C_{30}H_{44}O_4$: C, 76.88; H, 9.46. Found: C, 76.91; H, 9.58.

λ max. 2660 A. (E% 200—iso-octane)
λ max. 2700 A. (E% 186—ethanol)
$α_D$ +18 ±2° (1% $CHCl_3$).

EXAMPLE 2

*Preparation of 3-acetoxy-7,11-diketo - Δ$^{8,22}$ - ergostadiene from 3-acetoxy-7,11-dihydroxy-Δ$^{8,22}$-ergostadiene*

To a stirred suspension of 2.36 g. of 3-acetoxy-7,11-dihydroxy-Δ$^{8,22}$-ergostadiene in 50 ml. of purified acetone was added a solution of 6.65 millimols of chromic oxide in 5 ml. of 3.6 N sulfuric acid. The mixture was stirred at 10° C. for 10 minutes, after which 2 ml. water was added, and the mixture was stirred for 25 minutes at room temperature. The green inorganic material which had separated was removed by filtration. The filtrate was stirred while 50 ml. of water was added. The product was collected on a filter and washed with water. After drying in vacuo over phosphorous pentoxide the product, 3-acetoxy-7,11-diketo-Δ$^{8,22}$-ergostadiene, was obtained in the form of a light yellow powder. Yield: 2.26 g., M.P. 103–114° C.; Δ max. 2660 (E% 121—ethanol).

EXAMPLE 3

*Preparation of 3-acetoxy-7,11-diketo-Δ$^{22}$-ergostene from 3-acetoxy-7,11-diketo-Δ$^{8,22}$-ergostadiene*

A hot solution of 100 mg. of 3-acetoxy-7,11-diketo-Δ$^{8,22}$-ergostadiene in 5 cc. of acetic acid and 0.1 cc. of water was treated with 250 mg. of zinc. The initially yellow solution was decolorized rapidly and the mixture heated on the steam bath for three hours. Water was then added to precipitate the diketone, which was dissolved in benzene. Upon removal of the benzene, a residue was obtained which was recrystallized from methanol. Yield: 70 mg.; M.P. 196–198° C.; $α_D$ —25° (1.0% $CHCl_3$).

*Analysis.*—Calc'd for $C_{30}H_{46}O_4$: C, 76.55; H, 9.85. Found: C, 76.68; H, 9.59.

Alkaline hydrolysis of 3-acetoxy-7,11-diketo-Δ$^{22}$-ergostene yielded 3-hydroxy-7,11-diketo-Δ$^{22}$-ergostene, M.P. 198–199° C.

*Analysis.*—Calc'd for $C_{28}H_{44}O_3$: C, 78.46; H, 10.37. Found: C, 78.28; H, 10.09.

EXAMPLE 4

*Preparation of methyl 3-acetoxy-7,11-diketo-Δ$^8$-bisnorallocholenate from methyl 3-acetoxy-7,11-dihydroxy-Δ$^8$-bisnorallocholenate*

To a stirred solution of 1.60 g. of methyl 3-acetoxy-7,11-dihydroxy-Δ$^8$-bisnorallocholenate in 30 ml. of glacial acetic acid, was added a solution of 0.730 g. of sodium dichromate dihydrate in 30 ml. of glacial acetic acid over a period of 15 minutes. After stirring at 25° C. for two hours, the mixture was concentrated in vacuo to a small volume. The residue was shaken with 50 ml. of benzene and 50 ml, of water. The aqueous layer was extracted twice with 25 ml. portions of benzene. The combined benzene extracts were washed with 50 ml. of water, dried over anhydrous sodium sulfate, and the benzene was removed by vacuum distillation. The residual oil was triturated with 3 ml. of cold methanol and the resulting crystalline product was collected and washed with cold methanol. Yield: 550 mg., M.P. 183–185.5° C. After two recrystallizations from methanol, the melting point of the diketo compound was raised to 186.5–187.5° C. $[α]_D^{24}$=+38.7 (C=1.04, $CHCl_3$) λ max. 2700; E% 212.

*Analysis.*—Calc'd for $C_{25}H_{34}O_5$: C, 69.74; H, 7.96. Found: C, 70.00; H, 8.12.

EXAMPLE 5

*Methyl 3-hydroxy-11-keto-bisnorallocholanate*

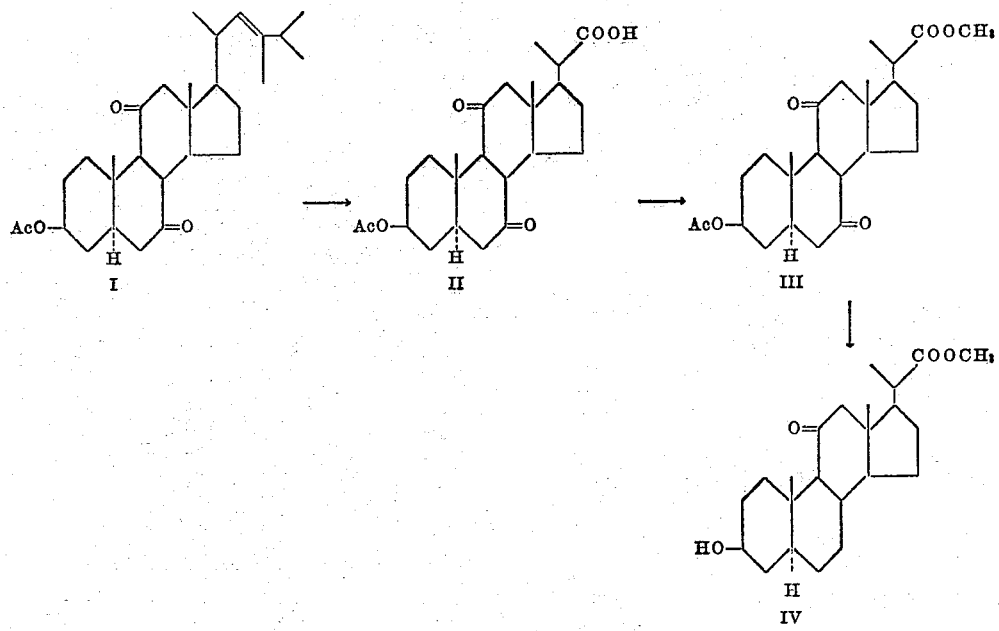

One gram of 3-acetoxy-7,11-diketo-Δ$^{22}$-ergostene (1) obtained as described in Example 3 was dissolved in 100 cc. of chloroform and ozone was passed through at ice bath temperature until the approximate theoretical amount of ozone was absorbed. The reaction mixture was diluted with 100 cc. of glacial acetic acid, cooled to 5° C. and oxidized with 0.5 g. chromic acid dissolved in 0.75 cc. water and 50 cc. glacial acetic acid.

After standing overnight, 5 cc. of methanol was added and the solvent was removed in vacuo to practically dryness. The residue in the flask was dissolved by shaking twice with a mixture of 25 cc. of 5% sulfuric acid and 50 cc. of benzene. The combined benzene solutions were dried over anhydrous magnesium sulfate, and the benzene was evaporated on the steam bath in a stream of nitrogen.

The residue was dissolved in 200 cc. of ether and stirred with 5 g. of sodium carbonate and 2 cc. of water for 21 hours. The sodium salt of 3-acetoxy-7,11-diketo-bisnorallocholanic acid (II) was filtered off and dried in a vacuum desiccator.

The dried sodium salt was suspended in 25 cc. of ether and 25 cc. of 50% sulfuric acid was added in small portions until the mixture was definitely acid. 100 cc. of ether was added to bring about complete solution of all solids. The aqueous layer was separated and extracted once with 50 cc. of ether.

The combined ethereal solutions were dried over anhydrous magnesium sulfate and then evaporated on the steam bath to a small volume, whereupon 3-acetoxy-7,11-diketo-bisnorallocholanic acid (II) crystallized out. The product was recrystallized from ether; M.P. 235–238° C. $[\alpha]_D^{23} = 24.6$, $\alpha = 0.68$, C=1.38% CHCl$_3$.

Analysis.—Calc'd. for $C_{24}H_{34}O_6$: C, 68.87; H, 8.19. Found: C, 68.67; H, 8.04.

125 mg. of 3-acetoxy-7,11-diketo-bisnorallocholanic acid was suspended in 25 cc. of ether and esterified with diazomethane. All solid dissolved and on evaporation of the ether to a small volume, the methyl ester (III) crystallized; M.P. 226.5–229° C. Mixed melting point with an authentic sample of the ester: 227–230° C.

5 g. of methyl 3-acetoxy-7,11-diketo-bisnorallocholanate (III) and 2.07 g. of powdered potassium hydroxide were placed in a 50 cc. round-bottom flask. 25 cc. of diethylene glycol and 2.3 cc. of 85% hydrazine hydrate were added and the temperature raised to 130–140° C. and held for 1 hour. The temperature was then raised to 195–200° C. and held for 2 hours.

After cooling, the reaction mixture was dissolved in benzene and water, 50% sulfuric acid added until an acid reaction was obtained. The benzene layer was separated, and the aqueous layer extracted three times with 50 cc. of benzene. The combined benzene solutions were washed with water and dried over anhydrous magnesium sulfate.

The benzene was treated with Darco. The benzene solution was concentrated in vacuo to dryness, the residue was dissolved in ether and esterified with an ethereal solution of diazomethane. The ether was evaporated, and the methyl 3-hydroxy-11-keto bisnorallocholanate (IV) was recrystallized from methanol, M.P. 177.5–180.5° C. Mixed M.P. with an authentic sample, 177–179° C. $[\alpha]_D^{23} = +41$.

EXAMPLE 6

Preparation of methyl 3-acetoxy-7,11-diketo-bisnorallocholanate from methyl 3-acetoxy-7,11-diketo-$\Delta^8$-bisnorallocholenate A mixture of 400 g. of methyl 3-acetoxy-7,11-diketo-$\Delta^8$-bisnorallocholenate, 20 ml. of glacial acetic acid, 0.4 ml. water, and 1.5 g. zinc dust was heated for 1 hour on the steam bath. One gram of zinc dust was added, and the mixture was heated for two hours more. After cooling to room temperature 50 ml. water was added to the mixture. The precipitated product, along with residual zinc, was collected on a filter. The dried mixture was extracted with benzene. After removal of the benzene by vacuum distillation, the product, methyl 3-acetoxy-7,11-diketo-bisnorallocholanate was recrystallized from methanol. Yield: 270 mg., M.P. 230–231.5° C. The analytical sample was recrystallized from methanol, M.P. 230.5–231.5° C. $[\alpha]_D^{24}$ −14.5 (C=1.55, CHCl$_3$).

Analysis.—Calc'd for $C_{25}H_{36}O_6$: C, 69.41; H, 8.39. Found: C, 69.70; H, 8.40.

EXAMPLE 7

Preparation of methyl 3-acetoxy-7,11-diketo-$\Delta^8$-cholenate from methyl 3-acetoxy-7,11-dihydroxy-$\Delta^8$-cholenate To a stirred suspension of 1.7 g. of methyl 3-acetoxy-7,11-dihydroxy-$\Delta^8$-cholenate in 100 cc. acetone was added at 20° C. with stirring a solution of 0.5 g. chromium trioxide in 4 cc. of 10% sulfuric acid over a period of ten minutes. After addition was complete, the mixture was stirred for one and one-half hours. The inorganic residue was filtered off and washed with three 10 cc. portions of acetone. The acetone solution was added with stirring to 66 cc. of water and the 7,11-diketo compound which precipitated was filtered, washed free of acid with water and dried. Yield: 1.57 g.; M.P. 112.5–113.5° C.

After recrystallization from ethanol the product, methyl 3-acetoxy-7,11-diketo-$\Delta^8$-cholenate melted at 114–115° C.

Analysis.—Calc'd for $C_{27}H_{40}O_6$: C, 70.40; H, 8.75. Found: C, 70.93; H, 8.30.

$\lambda_{max.}^{alc.}$ 2715 E% 187

EXAMPLE 8

Preparation of methyl 3-acetoxy-7,11-diketo-cholanate from methyl 3-acetoxy-7,11-diketo-$\Delta^8$-cholenate A mixture of 1.57 g. of methyl 3-acetoxy-7,11-diketo-$\Delta^8$-cholenate, 17 cc. of acetic acid, 1.7 cc. water and 3.4 g. zinc dust was heated on a steam bath for one hour.

The reaction mixture was diluted with 80 cc. benzene and the zinc residue was filtered off. The benzene solution was washed free of acid with water, dried over anhydrous sodium sulfate and concentrated to dryness. Yield 1.57 g.

The product was purified by recrystallization from ethanol. Yield: 1.17 g.; M.P. 162–163° C.

Analysis.—Calc'd for $C_{27}H_{42}O_6$: C, 70.10; H, 9.15. Found: C, 70.52; H, 8.65.

EXAMPLE 9

Preparation of 3-acetoxy-7,11-diketo-8-dehydrotigogenin from 3-acetoxy-7,11-dihydroxy-8-dehydrotigogenin To a suspension of 0.346 g. (0.71 millimol) of 3-acetoxy-7,11-dihydroxy-8-dehydrotigogenin in 10 ml. of acetone was added 0.8 ml. of a solution of 1.06 millimols of chromium trioxide in 3.6 N sulfuric acid. After stirring for 15 minutes, the chromium salts which had formed were removed by filtration and were washed with 5 ml. of acetone. The filtrate was treated with 50–60 ml. of water to precipitate the product which, after drying, weighed 0.283 g., M.P. 190–200° C. After two recrystallizations from methanol, 3-acetoxy-7,11-diketo-8-dehydrotigogenin was obtained as pale yellow needles, M.P. 226–227° C. $[\alpha]_D^{24}$ −14 (c.=0.813, CHCl$_3$) $\lambda$ max. (in ethanol) 2700, $E_{1\,cm}^{1\%}$ 180

EXAMPLE 10

Preparation of 3-acetoxy-7,11-diketotigogenin from 3-acetoxy-7,11-diketo-8-dehydrotigogenin A mixture of 130 mg. of 3-acetoxy-7,11-diketo-8-dehydrotigogenin, 4 ml. glacial acetic acid, one drop of water, and 400 mg. of zinc dust was heated on the steam bath for one hour. The mixture was cooled, and 30 ml. of water and 20 ml. of chloroform were added. After shaking thoroughly and filtering, the layers were separated, and the aqueous layer was extracted twice with five ml. portions of chloroform. The combined chloroform extracts were dried over sodium sulfate, and concentrated in vacuo. Recrystallization of the residue gave small rectangular prisms. Yield: 75 mg., M.P. 241–243° C., $[\alpha]_D^{24}$ −72° (c.=0.827, $CHCl_3$).

EXAMPLE 11

*Preparation of $\Delta^8$-allopregnene-3-ol-7,11,20-trione-3-acetate from $\Delta^8$-allopregnene-3,7,11-triol-20-one-3-acetate*

Seven hundred and eighty milligrams of $\Delta^{8(9)}$-allopregnene-3,7,11-triol-20-one-3-acetate in 20 ml. of acetone were oxidized with 2.66 millimols of chromium trioxide in 2 ml. of 10% aqueous sulfuric acid. After isolating the product in the usual way, it was recrystallized from methanol to give 260 mg. of pale yellow prisms, M.P. 177–179° C., $[\alpha]_D^{24}$ +71°(c.=1.12, $CHCl_3$). λ max. 2690, $E_{1cm}^{1\%}$ 226

EXAMPLE 12

*Preparation of allopregnan-3-ol-7,11,20-trione-3-acetate from $\Delta^8$-allopregnene-3-ol-7,11,20-trione-3-acetate*

A mixture of 210 mg. of $\Delta^{8(9)}$-allopregnene-3-ol-7,11,20-trione-3-acetate, 10 ml. of glacial acetic acid, two drops of water, and 1.0 g. of zinc dust was heated on the steam bath for 1 hour. The product was isolated in the usual manner, and recrystallized from methanol to give 140 mg. of hexagonal prisms, M.P. 214–215° C.

Various changes and modifications may be made in carrying out the present invention without departing from the spirit and scope thereof. Insofar as these changes and modifications are within the purview of the annexed claims, they are to be considered as part of our invention.

We claim:

1. Ergostene compounds of the formula

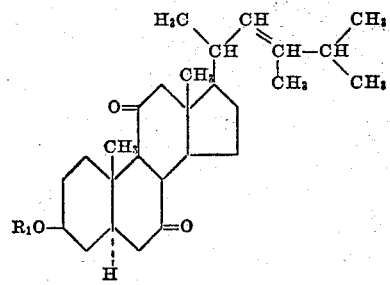

wherein $R_1$ is a substituent from the group consisting of hydrogen and lower fatty acid radicals.

2. 3-acetoxy-7,11-diketo-$\Delta^{22}$-ergostene of the formula

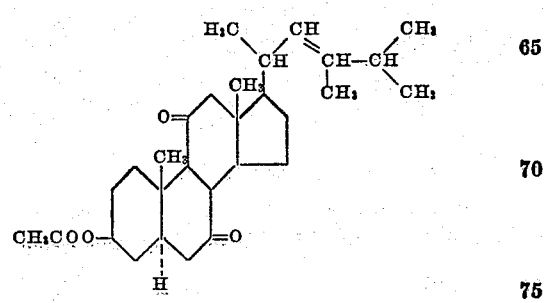

3. Tigogenin compounds of the formula

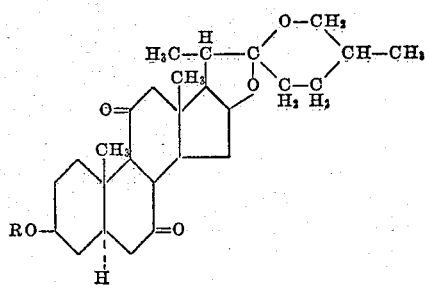

wherein R is a lower fatty acid radical.

4. 3-acetoxy-7,11-diketo-tigogenin of the formula

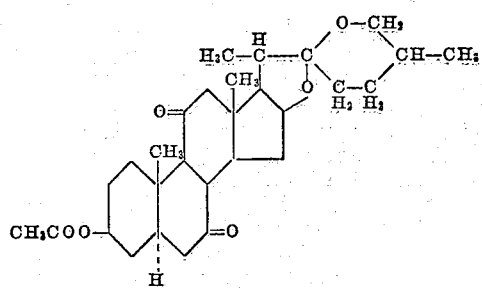

5. Cholanic acid compounds of the formula

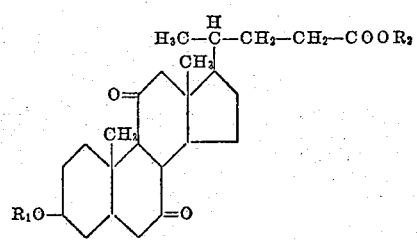

wherein $R_1$ represents a substituent from the group consisting of hydrogen and lower fatty acid radicals, and $R_2$ represents a substituent from the group consisting of hydrogen and lower alkyl radicals.

6. Methyl 3-acetoxy-7,11-diketo-cholanate of the formula

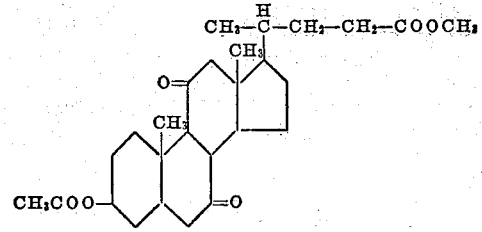

7. Bisnorallocholanic acid compounds of the formula

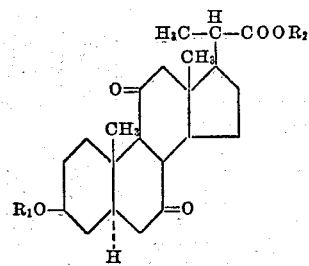

wherein $R_1$ is a substituent from the group consisting of hydrogen and lower fatty acid radicals, and $R_2$ is a substituent from the group consisting of hydrogen and lower alkyl radicals.

8. Methyl 3-acetoxy-7,11-diketo-bisnorallocholonate of the formula
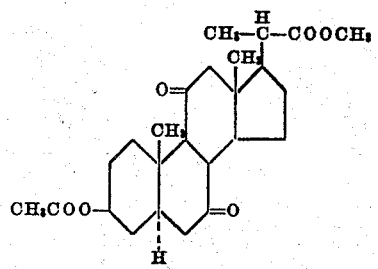
References Cited in the file of this patent
UNITED STATES PATENTS
2,749,337     Chemerda _____ June 5, 1956
OTHER REFERENCES
Doree: J. Chem. Soc., 1948, pages 988–990.
Chamberlin: J. A. C. S., pages 2396–2397, May 1951.
Fieser: J.A.C.S., page 2397, May 1951.
Fieser: J. Amer. Chem. Soc., page 2397, May 1951.
Fieser: J. Amer. Chem. Soc., page 4053, August 1951.
Heusser: Helv. Chim. Acta, vol. 34, p. 2106, p. 2132.